(No Model.)

J. E. WYNKOOP.
ARTIFICIAL STONE.

No. 248,547. Patented Oct. 18, 1881.

WITNESSES.

INVENTOR
J. E. Wynkoop

By
R. D. Williams
ATTORNEY.

UNITED STATES PATENT OFFICE.

JOHN E. WYNKOOP, OF POTTSVILLE, ASSIGNOR TO GEORGE H. IRWIN, OF HARRISBURG, PENNSYLVANIA.

ARTIFICIAL STONE.

SPECIFICATION forming part of Letters Patent No. 248,547, dated October 18, 1881.

Application filed September 6, 1881. (No model.)

*To all whom it may concern:*

Be it known that I, JOHN E. WYNKOOP, of the borough of Pottsville, Schuylkill county, State of Pennsylvania, have invented certain new and useful Improvements in Artificial Stone; and I hereby declare the same to be fully, clearly, and exactly described as follows, reference being had to the accompanying drawings, in which—

Figure 1:
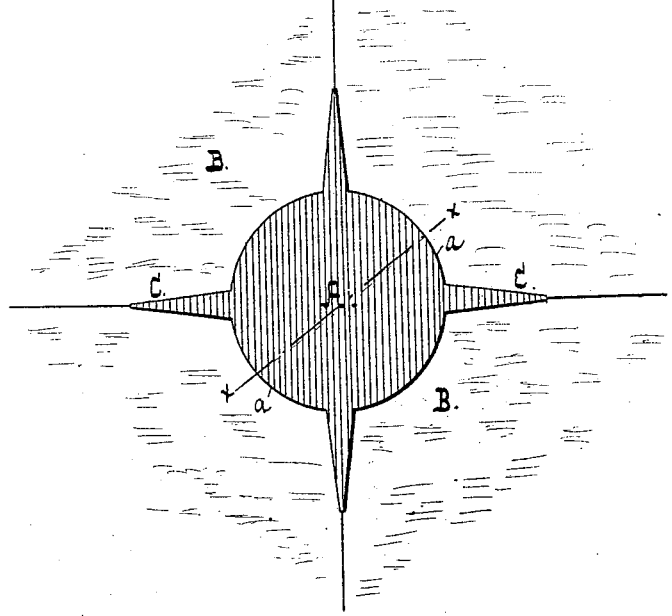
Figure 2:
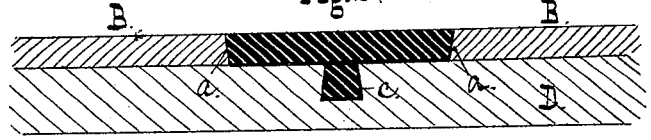

Figure 1 is a plan, and Fig. 2 a sectional, view of the stone as laid in a pavement with a center plate of peculiar form.

My invention relates to artificial stones for building or paving purposes; and it consists, first, in a composition or solution for moistening a mixture of cement and sand, as hereinafter set forth; and, second, in the device used at the meeting angles of the stones or slabs where laid in a sidewalk or pavement.

Slabs of artificial stone are liable to crumble or disintegrate at the salient angles under heavy pressure, necessitating the removal of the injured slab and its replacement by a new one. To obviate this I have devised a center plate or tile, made of cast-iron, porcelain, or equivalent material, designed to truncate the angles of the slabs and protect the meeting edges. This slab A is made with slightly beveled edges *a*, which overhang the slabs B B of artificial stone and prevent them from crumbling or breaking, serving also to hold the slabs at a uniform level. The plate or slab A may also have a dovetail anchor or knob or pin, *c*, to hold it in the substratum D of the pavement.

In preparing the artificial-stone slabs or building-blocks I prepare a solution of ten gallons of lime-water and add to it a mixture of two pounds of carbon bisulphide and one quart of turpentine, ten pounds of sal-ammoniac in saturated solution, ten pounds of starch or saccharine matter, and five pounds of gum-tragacanth boiled to the consistency of a thick paste. These ingredients are thoroughly mixed together and constitute the damping solution. For use it is diluted in the proportion of one quart (more or less) to forty gallons of water, and with this solution I dampen the mixture of cement and sand in the usual way, the proportions of cement to sand being determined by the nature of the work.

For a sidewalk the cast-iron slabs are laid upon the substratum, and the dampened mixture of sand and cement, colored as desired, is laid *in situ* with a trowel, and smoothed as usual. The radiating arms C of the center plates serve to further truncate the angles of the slabs and afford facility for removing an injured slab to replace it by a new one, besides being ornamental.

The stone so prepared may be made in massive blocks for building purposes, and is hard and strong, successfully resisting the action of water, frost, and heat.

What I claim, and desire to secure by Letters Patent, is—

1. The solution herein described for preparing artificial stone, consisting of lime, water, sal-ammoniac, turpentine, carbon bisulphide, and starch or saccharine matter, as set forth.

2. An artificial stone consisting of a mixture of sand and cement set with the solution described.

3. The plates B, having beveled edges and radiating arms, as and for the purpose set forth.

JOHN E. WYNKOOP.

Witnesses:
R. D. WILLIAMS,
W. A. BERTRAM.